(12) United States Patent
Fujikawa

(10) Patent No.: US 8,421,973 B2
(45) Date of Patent: Apr. 16, 2013

(54) LIQUID CRYSTAL DISPLAY DEVICE

(75) Inventor: Yohsuke Fujikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 499 days.

(21) Appl. No.: 12/594,004

(22) PCT Filed: Nov. 2, 2007

(86) PCT No.: PCT/JP2007/071391
§ 371 (c)(1),
(2), (4) Date: Sep. 30, 2009

(87) PCT Pub. No.: WO2008/129709
PCT Pub. Date: Oct. 30, 2008

(65) Prior Publication Data
US 2010/0118250 A1    May 13, 2010

(30) Foreign Application Priority Data

Mar. 30, 2007 (JP) .................................. 2007-091928

(51) Int. Cl.
*G02F 1/1343* (2006.01)
*G02F 1/1345* (2006.01)
*G02F 1/1339* (2006.01)

(52) U.S. Cl.
USPC ............................ 349/139; 349/152; 349/153

(58) Field of Classification Search ................. 349/139, 349/153, 154
See application file for complete search history.

(56) References Cited

U.S. PATENT DOCUMENTS

| 6,466,294 | B1 * | 10/2002 | Yamagishi et al. | 349/155 |
| 2003/0095225 | A1 * | 5/2003 | Hsu et al. | 349/149 |
| 2005/0094088 | A1 * | 5/2005 | Kao et al. | 349/190 |
| 2006/0012735 | A1 * | 1/2006 | Yamada et al. | 349/110 |
| 2006/0139556 | A1 * | 6/2006 | Ahn et al. | 349/153 |
| 2007/0069211 | A1 * | 3/2007 | Inoue et al. | 257/59 |
| 2007/0171162 | A1 * | 7/2007 | Mochizuki | 345/87 |

FOREIGN PATENT DOCUMENTS

| JP | 8-240807 A | 9/1998 |
| JP | 11-305259 | 11/1999 |
| JP | 2001-021909 | 1/2001 |
| JP | 2002-122870 | 4/2002 |
| JP | 2003-344863 | 12/2003 |
| JP | 2007-47507 | 2/2007 |

OTHER PUBLICATIONS

EP Supplementary Search Report mailed Feb. 24, 2011 in EP application 07831125.5.
International Search Report for PCT/JP2007/071391 mailed Jan. 22, 2008.

* cited by examiner

*Primary Examiner* — Edward Glick
*Assistant Examiner* — Dennis Y Kim
(74) *Attorney, Agent, or Firm* — Nixon & Vanderhye P.C.

(57) ABSTRACT

A sealant contains a plurality of conductive members, and is formed in a closed pattern, when viewed from a direction normal to a surface of a first substrate or a second substrate. A second electrode is formed on a surface located on the first substrate side of the second substrate, and a first electrode, which is provided so as to face a part of the second electrode, and is electrically connected to the second electrode through the conductive members contained in the sealant, is formed over the first substrate. The first electrode is provided so as to at least partially overlap a crossing portion of the sealant.

2 Claims, 7 Drawing Sheets

LIQUID CRYSTAL DISPLAY DEVICE

TECHNICAL FIELD

The present invention generally relates to liquid crystal display (LCD) devices. More particularly, the present invention relates to LCD devices in which a pair of substrates are electrically connected to each other through a conductive member.

BACKGROUND ART

As shown in FIG. 7 which is a perspective view, an LCD device 100 having a so-called liquid crystal cell 110 has a structure in which a first substrate 101 and a second substrate 102, which have different sizes from each other, are bonded together with a frame-shaped sealant interposed therebetween. The LCD device 100 has various electrodes on its opposing surfaces.

As shown in FIG. 8, which is an enlarged plan view of a region X in FIG. 7, the first substrate 101 and the second substrate 102 are held by spacers (not shown) so as to maintain a predetermined gap therebetween, and the gap between the first substrate 101 and the second substrate 102 is filled with a liquid crystal material. In some cases, the spacers are contained in the sealant 104.

There are three types of the sealant 104: a thermosetting type; an ultraviolet (UV)-curable type; and a thermosetting, UV-curable type. The type of the sealant 104 is selected as appropriate according to the method for forming the sealant 104. In a one drop fill (ODF) method (see, for example, Patent Document 1) which has been studied in recent years, it is preferable to use a thermosetting, UV-curable type sealant. The sealant 104 used to be formed by a screen printing method, but in recent years, is often formed by a dispenser method, which has high drawing accuracy and requires no screen printing plate. In the dispenser method, as shown in FIG. 8, a wider seal junction portion 117 is formed by connecting a drawing end point with a drawing starting point.

In the case where a plurality of switching devices, such as thin-film transistors (hereinafter referred to as TFTs), are formed in the liquid crystal cell 110, the first substrate 101 has a display region 106 having a display pixel group 105 where the TFTs and pixel electrodes are formed, a circuit portion 107 where a driving circuit and the like are formed, and a terminal region 108 where a plurality of terminals 109 are formed. On the other hand, a color filter, a counter electrode, and the like, which are not shown, are formed on the second substrate 102.

In general, the counter electrode on the second substrate 102 is rendered conductive with the first substrate 101 side through a so-called transfer (also referred to as a "common transfer"). That is, as shown in FIG. 8, a first electrode 111, made of a metal thin film and having a predetermined area, is formed in a corner of the first substrate 101 (see, for example, Patent Document 2). Moreover, a wiring 112, which has its one end connected to the first electrode 111 and the other end extended to the terminal region 108, is formed on the first substrate 101. The terminal 109 is formed at the other end of the wiring 112.

A transparent electrode, serving as a counter electrode (a second electrode) 113, is formed as a solid layer on the surface located on the first substrate 101 side of the second substrate 102, so as to extend substantially to the outer periphery of the second substrate 102. The second electrode 113 and the first electrode 111 are electrically connected to each other through a multiplicity of conductive members 114 contained in the sealant 104. A path from the second electrode 113, which is the counter electrode on the second substrate 102, via the conductive members 114, the first electrode 111, and the wiring 112, to the terminal 109 is formed in this manner. The "transfer" means an "electric connection structure between the first electrode 111 on the first substrate 101 and the second electrode 113 on the second substrate 102. In some cases, a plurality of transfers are provided in the liquid crystal cell 110.

Patent Document 1: Japanese Published Patent Application No. 2002-122870
Patent Document 2: Japanese Published Patent Application No. 2007-47507

DISCLOSURE OF THE INVENTION

Problems to be Solved by the Invention

Incidentally, as can be seen from FIG. 8, the first electrode 111, serving as a transfer, needs to be positioned so as to overlap a formation region of the sealant 104. This is because the first electrode 111 on the first substrate 101 and the second electrode 113 on the second substrate 102 need to be electrically connected to each other by the conductive members 114 contained in the sealant 104.

In addition, in the liquid crystal cell 110, as shown in FIG. 8, the sealant 104 needs to be drawn at a position located somewhat inside the outer edge of the liquid crystal cell 110, so that the wider seal junction portion 117 can be formed. Thus, a frame region (that is, a non-display region located outside the display region 106) is required also in the outside of the sealant 104. Thus, in the conventional liquid crystal cell 110, the first electrode 111 is also necessarily positioned so as to overlap the sealant 104 at a position located somewhat inside the outer edge of the liquid crystal cell 110.

At this time, as shown in FIG. 8, the first electrode 111 formed, for example, in the corner of the liquid crystal cell 110 has a relatively large area in order to ensure an electric connection state, and thus, a part of the first electrode 111 protrudes inside (toward the display region 106) a corner portion of the sealant 104 or the like. As a result, the frame region needs to be formed so as to have a large area inside the sealant 104.

Thus, in the liquid crystal cell 110 described above, both the first electrode 111 and the circuit portion 107 do not fit in a relatively narrow, desired frame region, and there has been a problem that the area of the frame region need necessarily be increased.

On the other hand, one possible method of suppressing an increase in area of the frame region is to position the first electrode and the circuit portion so as to overlap each other, when viewed in plan, in an isolated state from each other. In this structure, however, introduction of foreign particles during a manufacturing process may cause leakage between the first electrode and an electrode of the circuit portion. Thus, it is preferable to position the first electrode and the circuit portion so as not to overlap each other as much as possible, when viewed in plan.

The first electrode 111 has dimensions of several hundreds of micrometers by several hundreds of micrometers, and the circuit portion 107 has a width of around 1 mm. Thus, in view of the space for providing other wirings, marks, and the like, the minimum possible width dimension of the frame region in the liquid crystal cell 110 is about 2 mm, and it has been very difficult to implement both further reduction in area of the frame region, and high reliability.

The present invention was developed in view of the above problems, and it is a primary object of the present invention to reduce the area of a frame region as much as possible, and to increase reliability.

Means for Solving the Problems

In order to achieve the above object, an LCD device according to the present invention includes: a first substrate; a second substrate provided so as to face the first substrate; and a liquid crystal layer enclosed between the first substrate and the second substrate so as to be surrounded by a sealant. The sealant contains a plurality of conductive members, and is formed in a closed pattern, when viewed from a direction normal to a surface of the first substrate or the second substrate. A second electrode is formed on a surface located on the first substrate side of the second substrate. A first electrode, which is provided so as to face a part of the second electrode, and is electrically connected to the second electrode through the conductive members contained in the sealant, is formed over the first substrate. The first electrode is provided so as to at least partially overlap a junction portion of a drawing starting point and a drawing end point of the sealant.

Moreover, an LCD device according to the present invention includes: a first substrate; a second substrate provided so as to face the first substrate; and a liquid crystal layer enclosed between the first substrate and the second substrate so as to be surrounded by a sealant. The sealant contains a plurality of conductive members, and has a crossing portion formed so that a part of the sealant crosses another part thereof, when viewed from a direction normal to a surface of the first substrate or the second substrate. A second electrode is formed on a surface located on the first substrate side of the second substrate. A first electrode, which is provided so as to face a part of the second electrode, and is electrically connected to the second electrode through the conductive members contained in the sealant, is formed over the first substrate. The first electrode is provided so as to at least partially overlap the crossing portion of the sealant.

Moreover, an LCD device according to the present invention includes: a first substrate; a second substrate provided so as to face the first substrate; and a liquid crystal layer enclosed between the first substrate and the second substrate so as to be surrounded by a sealant. A second electrode is formed on a surface located on the first substrate side of the second substrate. A plurality of first electrodes, which are provided so as to face a part of the second electrode, and are electrically connected to the second electrode through a conductive member, are formed over the first substrate. The first electrodes have a main electrode, and at least one sub-electrode having a smaller area than that of the main electrode, when viewed from a direction normal to a surface of the first substrate.

Moreover, an LCD device according to the present invention includes: a first substrate; a second substrate provided so as to face the first substrate; and a liquid crystal layer enclosed between the first substrate and the second substrate so as to be surrounded by a sealant. A second electrode is formed on a surface located on the first substrate side of the second substrate. A plurality of first electrodes, which are provided so as to face a part of the second electrode, and are electrically connected to the second electrode through a conductive member, are formed over the first substrate. The first electrodes have a main electrode, and a sub-electrode having a different shape from that of the main electrode, when viewed from a direction normal to a surface of the first substrate. The sub-electrode is shaped so as to extend along the sealant, when viewed from the direction normal to the surface of the first substrate.

The sub-electrode may be formed in an L shape.

It is preferable that the LCD device further include: a display region formed in a rectangular shape; and a frame region formed outside the display region, and serving as a non-display region, and that in the frame region, the main electrode be provided on one side on a diagonal line of the display region, while the sub-electrode be provided on the other side on the diagonal line of the display region.

It is preferable that a larger number of sub-electrodes than that of main electrodes be provided.

The conductive member may be contained in the sealant.

The sealant may be formed in a closed pattern, when viewed from a direction normal to the surface of the first substrate or the second substrate, and the main electrode may be provided so as to at least partially overlap a junction portion of a drawing starting point and a drawing end point of the sealant.

The sealant may contain multiple ones of the conductive member, and may have a crossing portion which is formed so that a part of the sealant crosses another part thereof, when viewed from a direction normal to the surface of the first substrate or the second substrate. The main electrode may be provided so as to at least partially overlap the crossing portion of the sealant.

Effects of the present invention will be described below.

In the case of forming the sealant in a closed pattern, when viewed from the direction normal to the surface of the first substrate or the second substrate, a junction portion of a drawing start point and a drawing end point of the sealant is formed. At least a part of the first electrode overlaps the junction portion.

The junction portion is formed with a larger width than that of the remaining part of the sealant, because the sealant is supplied in an overlapping manner in the junction portion. That is, since the sealant extends not only inward (toward the liquid crystal layer) but also outward (toward the outer edges of the first substrate and the second substrate) in the junction portion, the first electrode can be positioned closer to the outside of the first substrate, while overlapping the junction portion. This can eliminate the space for providing a part of the first electrode at a position inside the sealant, whereby the area of the frame region (the non-display region around the display region) can be reduced.

In addition, even when a circuit portion, where a driving circuit and the like are formed, is provided inside the frame region, the first electrode and the circuit portion can be prevented from overlapping each other, when viewed from the direction normal to the surface of the first substrate or the second substrate, because the first electrode can be positioned closer to the outside, as described above. As a result, even if foreign particles are introduced during the manufacturing process, leakage between the first electrode and the circuit portion can be prevented, and reliability of the LCD device can be improved.

Moreover, in the case where the sealant has the crossing portion, the crossing portion is formed with a larger width than that of the remaining part of the sealant, because the sealant is supplied in an overlapping manner in the crossing portion. Thus, in this case as well, the area of the frame region can be reduced, and the reliability is improved, by providing the first electrode at a position closer to the outside, as in the case where the sealant has the junction portion.

Moreover, in the case where the first electrodes have a main electrode, and a sub-electrode having a smaller area than that of the main electrode, the main electrode mainly supplies an electric signal to the second electrode, while static electricity can be discharged to the outside mainly through the sub-electrode. That is, destruction of circuits by the static electricity can be prevented. Moreover, since the first electrodes are provided in a dispersed manner, the width of each first electrode (that is, the main electrode and the sub-electrode) can be reduced, and the area of the frame region can be reduced, while ensuring a predetermined electrode area as a whole.

Moreover, even in the case where the first electrodes have a main electrode, and a sub-electrode having a different shape from that of the main electrode, and the sub-electrode is shaped so as to extend along the sealant, the width of the sub-electrode can be reduced, and the area of the frame region can be reduced. Especially, when the sub-electrode is formed in an L shape, the sub-electrode can be preferably positioned in a corner pattern region of the sealant.

Moreover, in the case where the first electrodes are formed by the main electrode and the sub-electrode, it is more preferable, in terms of reducing the area of the frame region as described above, to position the main electrode so as to overlap the junction portion or the crossing portion of the sealant.

Effects of the Invention

According to the present invention, since the first electrode is provided so as to at least partially overlap the junction portion of the sealant, the first electrode can be positioned closer to the outside of the first substrate, while overlapping the junction portion. This enables the area of the frame region, which is the non-display region around the display region, to be reduced. In addition, since the first electrode does not overlap the circuit portion and the like, which are provided inside the sealant, leakage between the first electrode, and the circuit portion and the like can be prevented, and reliability of the device can be improved.

DESCRIPTION OF CHARACTERS

Figure 1:
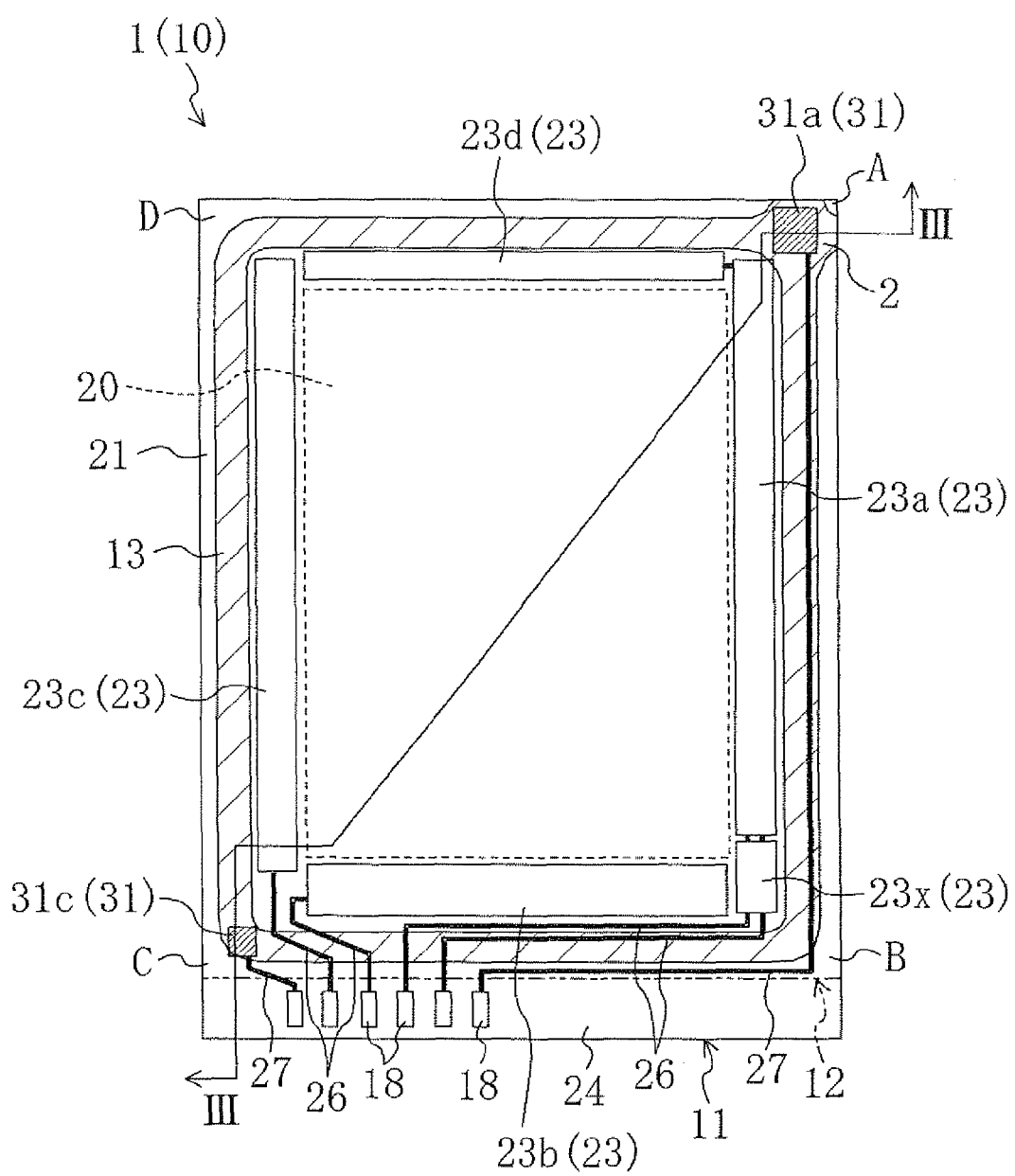
FIG. 1 is a plan view of a liquid crystal cell which is a main part of an LCD device of a first embodiment.

A, B, C, D corner
1 LCD device
2 crossing portion
3 junction portion
5, 6 glass substrate
10 liquid crystal cell
11 first substrate
12 second substrate
13 sealant
14 liquid crystal layer
15 conductive particle
16 pixel electrode
17 pixel
18 terminal
20 display region
21 frame region
23, 23a, 23b, 23c, 23d, 23x circuit portion
24 terminal region
26, 27 wiring
28 insulating film
29 opening
31 first electrode
31a main electrode
31b, 31c, 31d sub-electrode
32 second electrode
35 injection port
36 sealing part

BEST MODE FOR CARRYING OUT THE INVENTION

Embodiments of the present invention will be described in detail below with reference to the accompanying drawings. Note that the present invention is not limited to the following embodiments.

(First Embodiment)

Figure 2:
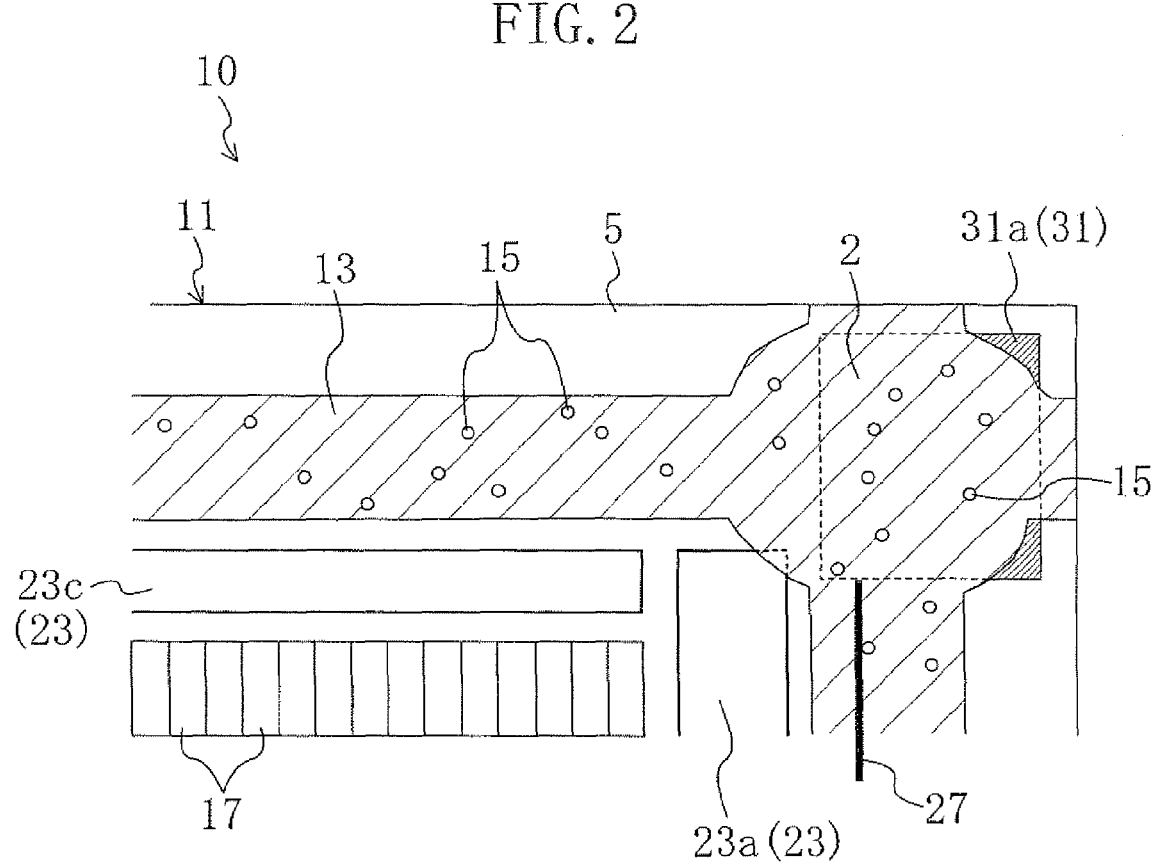
FIG. 2 is an enlarged partial plan view of FIG. 1.
Figure 3:
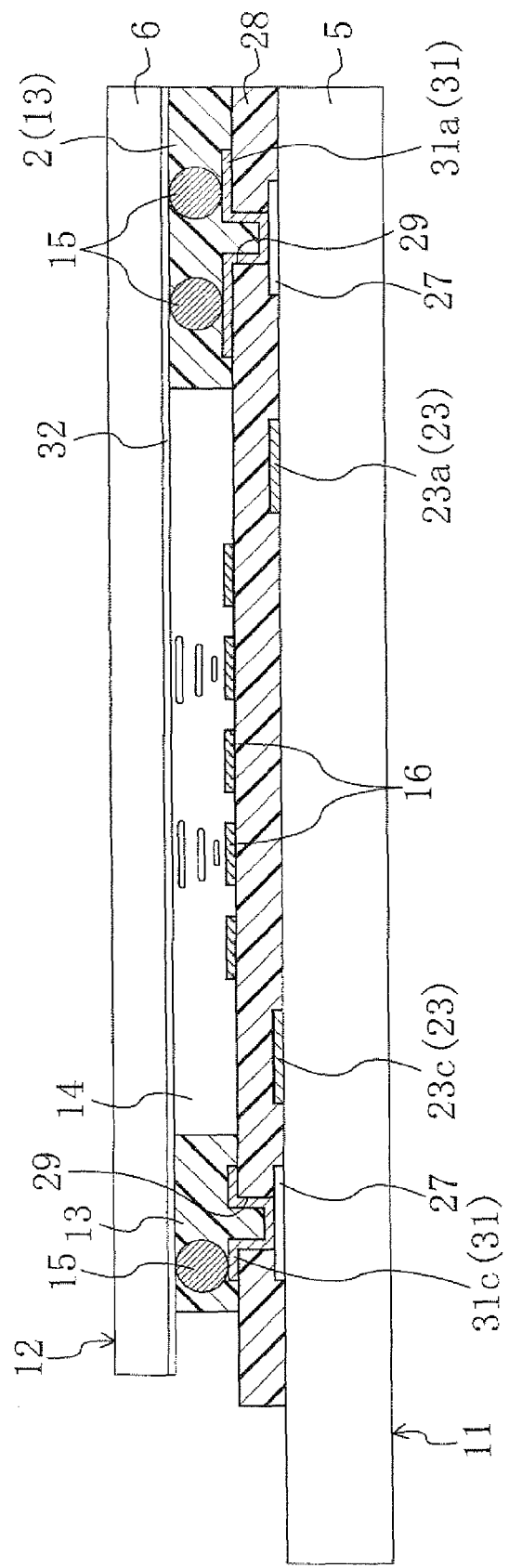
FIG. 3 is a cross-sectional view taken along line in FIG. 1.

FIGS. 1 through 3 show a first embodiment of the present invention. FIG. 1 is a plan view of a liquid crystal cell 10 which is a main part of an LCD device 1 of the first embodiment. FIG. 2 is an enlarged partial plan view of FIG. 1. FIG. 3 is a cross-sectional view taken along line III-III in FIG. 1.

The LCD device 1 includes a backlight unit, not shown, which serves as a light source, and the liquid crystal cell (liquid crystal panel) 10 which is superimposed on the user side of the backlight unit.

[Basic Structure of the Liquid Crystal Cell]

As shown in FIGS. 1 and 3, the liquid crystal cell 10 includes a first substrate 11 serving as a TFT substrate, and a second substrate 12 positioned so as to face the first substrate 11, and serving as a counter substrate. The first substrate 11 and the second substrate 12 are formed by glass substrates 5, 6, respectively. Moreover, the liquid crystal cell 10 includes a liquid crystal layer 14, which is enclosed between the first substrate 11 and the second substrate 12 so as to be surrounded by a sealant 13. That is, the first substrate 11 and the second substrate 12 are bonded together with the sealant 13 interposed therebetween. The sealant, which will be described later, is formed in a frame shape surrounding a display region 20, and contains conductive particles 15 as a plurality of conductive members.

The first substrate 11 and the second substrate 12 are formed in a rectangular shape, and the rectangular display region 20, which contributes to display, is formed substantially in a central region of these substrates. Moreover, a frame region 21, which is a non-display region that does not contributes to display, is formed outside the display region 20.

As shown in FIG. 3, a second electrode 32, serving as a counter electrode, is formed on the surface on the first substrate 11 side of the second substrate 12. The second electrode 32 is made of, for example, a transparent conductive film such as ITO (Indium Tin Oxide), and is formed as a solid layer on the whole surface of the glass substrate 6. Moreover, although not shown in the figure, a color filter, a black matrix, and the like are formed over the second substrate 12. Note that, although an organic alignment film or an inorganic alignment film is formed on the respective surfaces of the first substrate 11 and the second substrate 12, which are in contact with the liquid crystal layer 14, these alignment films are not shown in the figure.

As shown in FIG. 1, the first substrate 11 is formed to be larger than the second substrate 12, and a part of the frame region 21 of the first substrate 11, which does not overlap the second substrate 12, serves as a terminal region 24. A plurality of terminals 18 are arranged in line in the terminal region 24.

In the display region 20 of the first substrate 11, a plurality of pixels 17 are arranged in a matrix pattern on the surface on the second substrate 12 side. Although not shown in the figure, a TFT (Thin-Film Transistor) as a switching device, a pixel electrode 16 made of a transparent conductive film such as ITO, and the like are formed in each pixel 17.

In the frame region 21 of the first substrate 11, a plurality of circuit portions 23, where drive circuits for driving and controlling each pixel 17 are formed, are provided on the surface on the second substrate 12 side. The circuit portions 23 are preferably positioned between the display region 20 and the sealant 13. Note that the circuit portions 23 may partially overlap the sealant 13, when viewed from the direction normal to the first substrate 11, and the area of the frame region 21 can be effectively reduced by combining this structure with a transfer structure of the present invention. One ends of wirings 26 formed in the frame region 21 are connected to the circuit portions 23. The other ends of the wirings 26 are connected to the terminals 18.

Moreover, a first electrode 31, which forms a transfer (also referred to as a common transfer), is formed in the frame region 21 of the first substrate 11. The first electrode 31 is positioned so as to face a part of the second electrode 32, and is electrically connected to the second electrode 32 through the conductive particles 15.

As shown in FIGS. 1 and 3, the first electrode 31 of the first embodiment has a main electrode 31a, and at least one sub-electrode 31c which has a smaller area than that of the main electrode 31a, when viewed from the direction normal to the surface of the first substrate 11. As shown in FIG. 1, the main electrode 31a and the sub-electrode 31c are formed in a rectangular shape. Thus, in the frame region 21, the main electrode 31a is positioned on one side on a diagonal line of the display region 20, while the sub-electrode 31c is positioned on the other side on the diagonal line of the display region 20.

The main electrode 31a and the sub-electrode 31c are positioned in corners of the first substrate 11 so as to at least partially overlap the sealant 13, when viewed from the direction normal to the surface of the first substrate 11. One ends of wirings 27 formed in the frame region 21 are respectively connected to the main electrode 31a and the sub-electrode 31c. The other ends of the wirings 27 are connected to the terminals 18.

Note that it is desirable that the wirings 26, 27 be made of a metal thin film having a low resistance. As described later, however, in the case of curing the sealant 13 by UV radiation, it is preferable that those wirings 26, 27, which are positioned at least near the side in contact with the liquid crystal layer 14 in a region where the sealant 13 is formed, be disposed with an L/S (Line and Space) pattern having a high aperture ratio (e.g., L/S=40/10 μm) so as to prevent the sealant from being left uncured due to insufficient UV radiation.

Note that, it is preferable that the wirings 27 be positioned in a region occupied by the sealant 13, more preferably, in a region that extends from the center line of the drawing of the sealant 13 toward the outside of the liquid crystal cell 10. Thus, even if the wirings 27 are relatively wide, the wirings 27 can be prevented from blocking UV radiation to the sealant 13 because no wiring 27 is present in a region of the sealant 13 located closer to the liquid crystal layer, where the sealant 13 should be cured by UV radiation. As a result, a sufficiently UV-cured sealant 13 can be obtained. Moreover, it goes without saying that there is no problem in terms of an equivalent circuit, even if the wirings 27 and the second electrode 32 on the second substrate 12 are short-circuited by a foreign particle in the outer region of the sealant 13.

As shown in FIG. 3, the wirings 26, 27 and the circuit portions 23 are formed on the glass substrate 5 of the first substrate 11. Moreover, an insulating film 28, which covers the wirings 26, 27 and the circuit portions 23, is formed over the glass substrate 5. This insulating film 28 is provided in order to protect the first substrate 11 and to obtain the pixels 17 having a high aperture ratio.

The pixel electrodes 16, the main electrode 31a, the sub-electrode 31c, and the sealant 13 are formed on the insulating film 28. The main electrode 31a and the sub-electrode 31c are respectively electrically connected to the wirings 27 through openings 29 that are formed so as to extend through the insulating film 28.

Note that, in order to obtain a pixel structure for both reflective display and transmissive display, which has a concavo-convex reflector or a liquid crystal layer having a multi-gap structure, an insulating film having a difference in height may be formed over the first substrate 11 by using a photosensitive resin.

As shown in FIG. 1, the circuit portions 23 for supplying a control signal to the pixels 17 are formed by circuit portions 23a, 23b, 23c, 23d, and each circuit portion 23 is formed in a region along one of four sides of the display region 20. Note that the present invention is not limited to this, and the circuit portions 23 may be formed in at least one of the regions along the four sides of the display region 20.

For example, in FIG. 1, the circuit portion 23a or the circuit portion 23c, positioned so as to face each other, may be formed as a scanning signal circuit, and the circuit portion 23b or 23d, positioned so as to face each other, may be formed as a data signal circuit or a precharge circuit.

Note that, in the case where the terminals 18 are formed in a left or right region of the liquid crystal cell 10, the terminal region 24 is formed on the left or right side of the display region 20 in FIG. 1. In this ease, the circuit portion 23a or the circuit portion 23c serves as a data signal circuit or a precharge circuit, while the circuit portion 23b or 23d serves as a scanning signal circuit.

Moreover, a simple circuit may be formed in at least one of the regions along the four sides of the display region 20 where the circuit portions 23 are formed. This simple circuit may be a simple circuit which is not used in the state of a final product of the liquid crystal cell 10, but is used in a stage of the manufacturing process, for example, in a lighting inspection that is performed before the liquid crystal cell 10 is mounted on a main body of a product.

Moreover, in addition to the circuit portions 23 described above, at least one circuit, such as a protection circuit, a level shifter circuit, a power supply circuit, a sensing circuit, and an audio circuit, may be formed as a circuit portion 23x in one of the above four regions, or in a separate region (e.g., near a corner of the liquid crystal cell 10). That is, a circuit, which is different from a scanning signal circuit (a gate driver circuit) or a data signal circuit (a source driver circuit), and a wiring group may be provided as the circuit portion 23x.

The circuit portions 23a, 23b, 23c, 23d and the circuit portion 23x may be formed by monolithic circuits that include TFTs formed by using, for example, low temperature polysilicon as a base material. Moreover, simple circuits can be formed also by circuits that include TFTs made of amorphous silicon.

These circuit portions 23a, 23b, 23c, 23d are formed so as to occupy a rectangular region along the periphery of the display region 20, and the longer side of the rectangular region has substantially the same length as that of one side of the display region 20.

Note that, from the standpoint of occupying a fixed region of the frame region 21, the formation region of the circuit portions 23a, 23b, 23c, 23d and the circuit portion 23x includes a region including no TFT and the like, where merely a plurality of bus lines are arranged like parallel lines. For example, the formation region of the circuit portions 23a, 23b, 23c, 23d and the circuit portion 23x includes the same number of wiring groups as the number of rows or columns of a dot array that forms a display screen, a phase-developed video signal line group, and the like.

[Structure of the Sealant]

The sealant 13 is made of, for example, a thermosetting, UV-curable type resin, and is drawn in a closed pattern by a dispenser so as to surround a region which is filled with a liquid crystal material, in a common region where the first substrate 11 and the second substrate 12 overlap each other, when viewed from the direction normal to the surface of the first substrate 11 or the second substrate 12. Thus, the liquid crystal cell 10 is filled with the liquid crystal material by a so-called ODF method.

In FIG. 1, the upper right, lower right, lower left, and upper left corners of the common region of the first substrate 11 and the second substrate 12 are herein referred to as corners A, B, C, D, respectively. The sealant 13 is formed so that a starting-point side and an end-point side of the sealant 13 cross each other and are joined together in, for example, the corner A of the liquid crystal cell 10. In other words, the sealant 13 has a crossing portion 2 that is formed so that a part of the sealant 13 crosses another part thereof, when viewed from the direction normal to the surface of the first substrate 11 or the second substrate 12. It can also be said that the crossing portion 2 is a junction portion of the sealant 13.

The sealant 13 has a substantially circular arc shape in other corners B, C, D where no crossing portion 2 is formed. Thus, in the step of forming the sealant 13, the drawing direction of the sealant 13 can be changed by 90 degrees without decreasing the drawing speed by the dispenser (that is, the moving speed of a stage).

Thus, the sealant 13 is formed so as to be wider in the crossing portion 2 as a junction portion than in a portion that is drawn straight along the outer edge of the frame region 21 of the liquid crystal cell 10, and the sealant 13 occupies a region closer to the outer edge of the liquid crystal cell 10. In other words, the sealant 13 occupies a region located farther away from the display region 20.

This wide crossing portion 2 is necessarily formed by joining or crossing of the sealant 13, by a larger amount of resin of the sealant 13 which is supplied onto the substrate. Thus, the widened pattern of the sealant 13 can be easily obtained without performing any special processing on the substrate. Widening the pattern of the sealant 13 by crossing is the most preferable in that the closed pattern of the sealant 13 can be reliably obtained.

Note that, in order to change the pattern width of the sealant 13 at an arbitrary position, concaves and convexes may be intentionally formed on the surface of the first substrate 11 or the second substrate 12, which is to be in contact with the sealant 13, so as to change the finished width of the sealant 13. In this case, care should be taken because the concavo-convex pattern may cause uneven rubbing streaks or uneven transfer, and may result in an uneven liquid crystal cell thickness. No such problem occurs in the present invention because the sealant is widened by the drawing pattern of the dispenser.

In the case where the crossing portion 2 of the sealant 13 is formed in the corner A of the liquid crystal cell 10, an end face of the sealant 13 reaches an end face of the liquid crystal cell 10, as shown on the right side in FIG. 3. Thus, in the case where the sealant 13 is finished so as to be exposed at the end face of the liquid crystal cell 10, it may become difficult to cut out the liquid crystal cell 10 from a mother glass.

In such a case, the liquid crystal cell 10 can be cut out from the mother glass after the first substrate 11 and the second substrate 12 are thinned so as to have different thicknesses from each other. For example, it is preferable that the thickness of the first substrate 11 be reduced to 0.3 mm, while the thickness of the second substrate 12 be reduced to 0.2 mm. Moreover, it is preferable to increase the difference in thickness between the first substrate 11 and the second substrate 12, and to reduce the total thickness of the first substrate 11 and the second substrate 12.

[Structure of the Transfer]

A main feature of the present invention lies in the structure of the transfer formed between the first substrate 11 and the second substrate 12. That is, the transfer is formed in the crossing portion 2 of the sealant 13 in the first embodiment.

The transfer is formed by the first electrode 31 (the main electrode 31a and the sub-electrode 31c) on the first substrate 11, the second electrode 32 on the second substrate 12, and the conductive particles 15 interposed between these electrodes. The first electrode 31 is positioned so as to face a part of the second electrode 32. Moreover, the conductive particles 15 are formed by, for example, metal particles, metal-coated particles, or the like. Thus, the first electrode 31 is electrically connected to the second electrode 32 through the conductive particles 15.

The main electrode 31a is positioned so as to at least partially overlap the crossing portion 2, when viewed from the direction normal to the surface of the first substrate 11. It is desirable that the main electrode 31a be formed so as to occupy a region located substantially immediately below the crossing portion 2 (the junction portion) of the sealant 13 provided in the corner A of the liquid crystal cell 10. This enables the main electrode 31a to be positioned closer to the outside of the liquid crystal cell 10, whereby the main electrode 31a and the circuit portions 23a, 23d can be prevented from interfering with each other near the corner A.

Positioning the main electrode 31a in this manner enables the circuit portions 23a, 23d and the main electrode 31a to be disposed in a smaller frame region 21. Moreover, since the sealant 13 is widened in the crossing portion 2, the main electrode 31a and the second electrode 32 in the transfer can be more reliably electrically connected to each other.

Note that the first electrode 31 may be made of either a metal thin film or a transparent conductive film. However, in the case where the sealant 13 is a UV-curable type sealant, a material that blocks UV light is not preferable for the first electrode 31, and thus, it is desirable to form the first electrode 31 by a transparent conductive film such as ITO or IZO.

In order to explain another advantage of the present invention, an example will be considered in which the circuit portion 23a is moved toward the corner A of the liquid crystal cell 10 (upward in FIG. 1) by providing the circuit portion 23x in the corner B of the liquid crystal cell 10 as shown in FIG. 1.

In this case, interference between the main electrode 31a and the circuit portion 23a needs to be avoided in the corner A. However, the main electrode 31a is formed at a position closer to the outside of the liquid crystal cell 10, as described above. Thus, even if the circuit portion 23a is moved toward the corner A of the liquid crystal cell 10, an increase in area of the frame region 21 of the liquid crystal cell 10 can be suppressed, while avoiding interference between the circuit portion 23a and the main electrode 31a. The same applies to the case where the circuit portion 23x is positioned in other corners B, C, D of the liquid crystal cell 10.

That is, in the case where the circuit portion 23x is formed in at least one of the four corners A, B, C, D of the liquid crystal cell 10, at least one of the circuit portions 23a, 23b, 23c, 23d, which is located adjacent to the circuit portion 23x, is necessarily moved toward the outside of the liquid crystal cell 10, as a consequence. Moreover, the circuit portion 23x itself necessarily disturbs the positioning of the transfer.

In order to solve such a problem, it is effective to use the crossing portion 2 (the junction portion) of the sealant 13 as a transfer, as described in the present invention, and the effect thereof is significant especially when three components, that is, any one of a scanning signal circuit, a data signal circuit, a precharge circuit, and a simple inspection circuit, the circuit portion 23x, and the main electrode 31a, are positioned in the frame region 21 along any one side of the liquid crystal cell 10.

[Structure of a Conducting Portion]

The first electrode 31 has a function as a transfer and a conducting portion. The conducting portion serves to discharge static electricity, generated in the second electrode 32, toward the first substrate 11. Of the first electrode 31, the main electrode 31a having a large area functions mainly as a transfer. On the other hand, the sub-electrode 31c having a small area functions mainly as a conducting portion.

The sub-electrode 31c is positioned substantially immediately below the sealant 13 near the corner C of the liquid crystal cell 10. Although the circuit portions 23b, 23c or the wirings 26, 27 are positioned near the sub-electrode 31c, this is preferable in terms of reducing the area of the frame region 21, because the sub-electrode 31c has a relatively small area.

Note that, since the main electrode 31a is provided, it may seem that no sub-electrode 31c is necessary. However, providing the sub-electrode 31c has the following advantage.

In general, one of the reliabilities required as the liquid crystal cell 10 is the resistance to static electricity. Since the second electrode 32 formed on the second substrate 12 of the liquid crystal cell 10 extends to the outside of the sealant 13, the second electrode 32 is susceptible to static electricity from outside of the liquid crystal cell 10.

It is herein assumed that the main electrode 31a as the first electrode 31 is provided only in the corner A of the liquid crystal cell 10. In this case, neither the circuit portions 23a, 23d nor the pixels 17, which are located near the corner A, are destroyed even if static electricity is generated near the corner A.

However, if static electricity is generated near the corners B, C, D where no main electrode 31a is provided, the circuit portions 23 and the pixels 17, which are located near the corners B, C, D, tend to be destroyed. That is, destruction caused by the static electricity can specifically occur depending on the presence or absence of the transfer (or the conducting portion) in the corners A, B, C, D. This is considered to be because destruction of the circuit portions 23 and the pixels 17 on the first substrate 11 is avoided as electric charge is discharged through (the conducting portion corresponding to) the transfer, and the wirings 27 to the terminals 18 before the static electricity entering from the second substrate 12 is discharged to the circuit portions 23 and the pixels 17.

As can be seen from the above description, in the case where the second electrode 32 of the second substrate 12 is formed so as to extend to the outside of the sealant 13, it is preferable to provide the main electrode 31a in at least one of the four corners A, B, C, D of the liquid crystal cell 10, and to provide the sub-electrode 31c in other corners A, B, C, D. Thus, it is desirable that, in this manner, the main substrate 31a or the sub-electrode 31c (the transfer or the conducting portion) be reliably caused to exist in all of the four corners A, B, C, D of the liquid crystal cell 10, so that a discharge path for the statistic electricity entering from the second electrode 32 is ensured in the four corners A, B, C, D.

Note that whether the plurality of first electrodes 31 are caused to function mainly as a transfer or a conducting portion can be determined not only by the area and the shape of the first electrode 31, but also by, for example, the magnitude of the overlapping area of the first electrode 31 with the second electrode 32, the magnitude of the electric resistance of the first electrode 31 according to the difference in electrode material.

The LCD device 1 is manufactured by bonding the first substrate 11 and the second substrate 12, which are formed in advance, to each other with the sealant 13 and the liquid crystal layer 14 interposed therebetween. The circuit portions 23a, 23b, 23c, 23d, the wirings 26, 27, the main electrode 31a, the sub-electrode 31c, the pixel electrodes 16, and the like are formed over the first substrate 11. For example, the main electrode 31a and the sub-electrode 31c can be formed simultaneously with the pixel electrodes 16.

Then, the sealant 13 is drawn by a dispenser on the first substrate 11 or the second substrate 12. Drawing of the sealant 13 on the first substrate 11 or the second substrate 12 is started from the corner A, and the sealant 13 is then supplied so as to surround the display region 20 until the sealant 13 returns to the corner A. Thus, the crossing portion 2 of the sealant 13 is formed in the corner A, and the sealant 13 is formed in a closed pattern as a whole.

Next, a liquid crystal material is dropped inside the sealant 13 on the first substrate 11 or the second substrate 12 having the sealant 13 formed thereon. Then, the first substrate 11 and the second substrate 12 are bonded together, and the sealant 13 is cured by UV radiation and heating, whereby the LCD device 1 is manufactured.

[Effects of the First Embodiment]

Thus, according to the first embodiment, since the main electrode 31a is provided so as to at least partially overlap the crossing portion 2 of the sealant 13, the main electrode 31a can be positioned closer to the outside of the first substrate 11, while overlapping the crossing portion 2. As a result, the area of the frame region 21 can be reduced. In addition, since the main electrode 31a does not overlap the circuit portions 23 and the like which are positioned inside the sealant 13, leakage between the main electrode 31a, and the circuit portions 23 and the like is prevented, whereby reliability of the device can be improved.

That is, since the sealant extends not only inward (toward the liquid crystal layer 14) but also outward (toward the outer edges of the first substrate 11 and the second substrate 12) in the crossing portion 2, the main electrode 31a can be positioned closer to the outside of the first substrate 11, while overlapping the crossing portion 2. This can eliminate the space for providing a part of the main electrode 31a at a position inside the sealant 13, whereby the area of the frame region 21 can be reduced.

In addition, even if the circuit portions 23 are provided inside the frame region 21, the main electrode 31a and the circuit portions 23 can be prevented from overlapping each other, when viewed from the direction normal to the surface of the first substrate 11 or the second substrate 12, because the main electrode 31a can be positioned closer to the outside, as described above. As a result, even if foreign particles are introduced during the manufacturing process, leakage between the main electrode 31a and the circuit portions 23 can be prevented, and reliability of the LCD device 1 can be improved. Moreover, since the sealant 13 has the crossing portion 2, a wider seal portion can be obtained, and reliable sealing can be implemented.

Moreover, since the main electrode 31a having a relatively large area is positioned so as to overlap the crossing portion 2, and the sub-electrode 31c having a relatively small area is positioned so as to overlap the sealant 13, the main electrode 31a can be made to function mainly as a transfer, while the sub-electrode 31c can be made to function as a conducting portion. Moreover, since the main electrode 31a and the sub-electrode 31c are positioned so as to face each other on a diagonal line of the display region 20, electric charge can be uniformly supplied to the second electrode 32, and the display quality can be improved.

(Second Embodiment)

Figure 4:
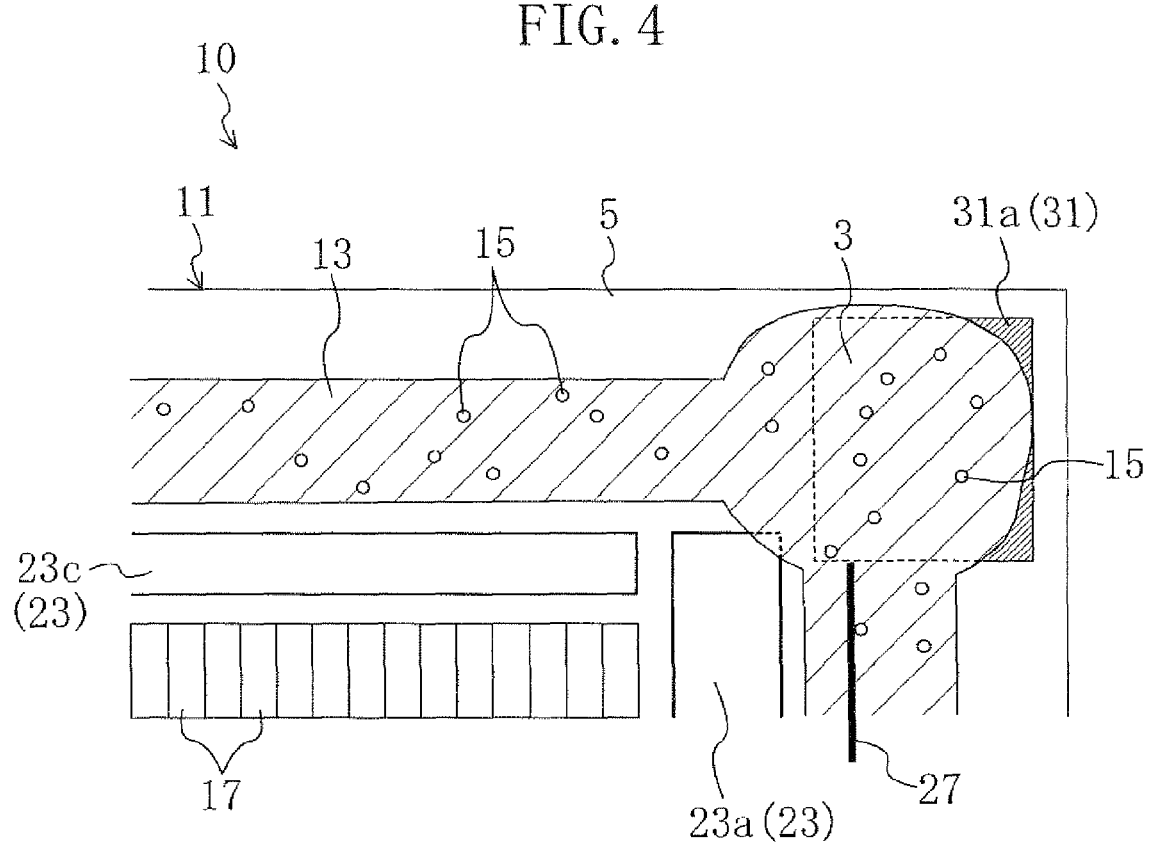
FIG. 4 is an enlarged partial plan view of a liquid crystal cell of a second embodiment.

FIG. 4 shows a second embodiment of the present invention. FIG. 4 is an enlarged partial plan view of a liquid crystal cell 10. Note that, in the following embodiments, the same parts as those of FIGS. 1 through 3 will be denoted by the same reference characters, and detailed description thereof will be omitted.

In the first embodiment, the main electrode 31a as the first electrode 31 is positioned so as to at least partially overlap the crossing portion 2 of the sealant 13. In the second embodiment, on the other hand, the main electrode 31a is positioned so as to at least partially overlap a junction portion 3 of the sealant 13, when viewed from the direction normal to the surface of the first substrate 11.

That is, the sealant 13 contain a plurality of conductive particles 15 as in the case of the first embodiment, and is formed in a closed pattern that connects a drawing starting point and a drawing end point, when viewed from the direction normal to the surface of the first substrate 11 or the second substrate 12. As shown in FIG. 4, the junction portion 3, where the drawing starting point and the drawing end point are joined together, is formed in the sealant 13. Like the crossing portion 2, the junction portion 3 is formed with a larger width than that of the remaining portion, because the sealant 13 of the drawing start point and the sealant 13 of the drawing end point overlap each other.

Thus, in the second embodiment as well, the main electrode 31a can be positioned closer to the outside of the first substrate 11, while overlapping the junction portion 3, whereby reliability of the device can be improved, while reducing the area of the frame region 21, as in the case of the first embodiment. Note that the position of the junction portion 3 is not limited to the corners of the liquid crystal cell 10, but the junction portion 3 may be positioned in any of the formation regions of the sealant 13 along the outer edge of the liquid crystal cell 10.

(Third Embodiment)

Figure 5:
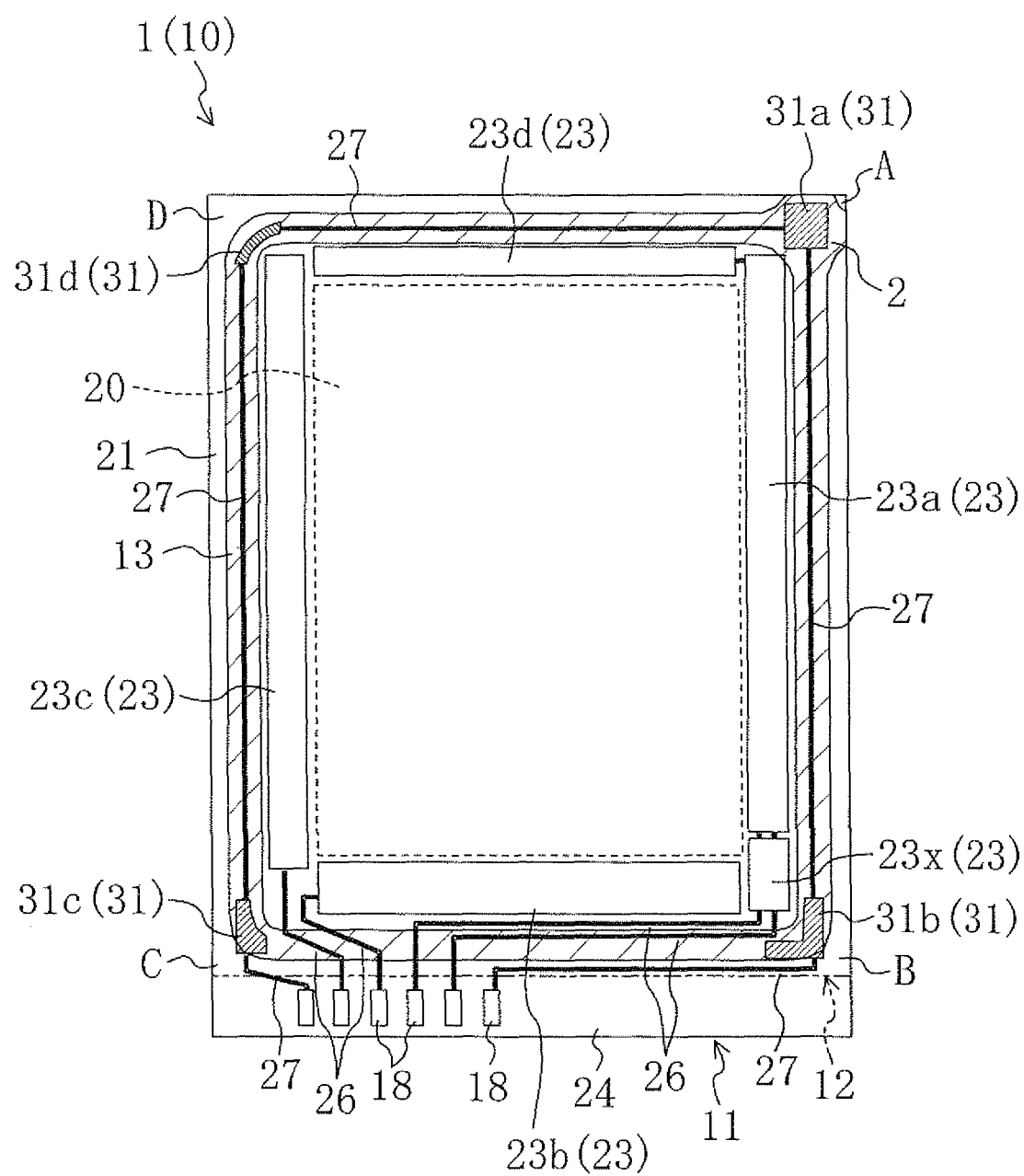
FIG. 5 is a plan view of a liquid crystal cell which is a main part of an LCD device of a third embodiment.

FIG. 5 is a plan view of a liquid crystal cell 10, showing a third embodiment of the present invention.

In the first embodiment, one sub-electrode 31c is positioned in the corner C. In the third embodiment, on the other hand, three sub-electrodes 31b, 31c, 31d as the first electrodes 31 are positioned in the corners B, C, D, respectively. The number of sub-electrodes 31b, 31c, 31d is equal to or larger than the number of main electrodes 31a. Note that the number of sub-electrodes is not limited to three, but one or more sub-electrodes can be formed.

As shown in FIG. 5, the sub-electrodes 31b, 31c, 31d have a smaller area than that of the main electrode 31a, when viewed from the direction normal to the surface of the first substrate 11. Moreover, the sub-electrodes 31b, 31c, 31d have a different shape from that of the main electrode 31a, when viewed from the direction normal to the surface of the substrate 11, and are shaped so as to extend along the sealant 13. Moreover, the sub-electrode 31b, for example, is formed in an L-shape so as to extend along the sealant 13 in the corner B.

As shown in FIG. 5, these sub-electrodes 31b, 31c, 31d and the main electrode 31a are connected to each other by the wirings 27 extending along the sealant 13. That is, the main electrode 31a is connected to the sub-electrodes 31b, 31d by the wirings 27. Moreover, the sub-electrode 31d is connected to the sub-electrode 31.c by the wiring 27.

Incidentally, the LCD device 1 having a relatively small display screen, such as those applied to digital cameras, cellular phones, and the like, requires only a small number of transfers. Moreover, since portability is considered to be important, and a small frame region 21 is required, it is not preferable to provide an excessively large number of main electrodes 31a having a large area.

However, providing only one main electrode 31a having a large area should be avoided in terms of ensuring the resistance to static electricity as described above. That is, it is preferable to determine the number "x" of main electrodes (transfers) 31a and the number "y" of sub-electrodes (conducting portions) 31b, 31c, 31d, in view of the screen size.

For example, in the liquid crystal cell 10 having a small display screen, the transfers can be positioned so as to satisfy x≦y. On the other hand, in the liquid crystal cell 10 in which at least one of the width and length dimensions of the display screen is relatively large, the transfers can be positioned so as to satisfy x≧y. In the liquid crystal cell 10 of up to a so-called about 4-inch screen size, the four corners A, B, C, D of the liquid crystal cell 10 are candidate positions for the transfers, and thus, "x" and "y" can be set so that x+y=4. In this case, it is preferable that x=1 or 2.

Note that, in the case where the screen size is small, but an excess region in the frame region 21 is relatively large, "x" and "y" may be set to x=4 and y=0, or x=3 and y=1, regardless of the above inequalities that define the relation between "x" and "y." However, this cannot be applied to so many cases, in view of a recent trend toward narrower frame regions.

Moreover, if any measure against static electricity can be taken in a housing accommodating the liquid crystal cell 10, the main electrode 31a or the sub-electrodes 31b, 31c, 31d need not necessarily be provided in all of the four corners A, B, C, D of the liquid crystal cell 10.

However, such a housing has disadvantages, such as causing an increase in cost, and making it difficult to standardize the design of various models. Thus, in order to facilitate standardization of the design, it is preferable to provide a plurality of first electrodes 31 (that is, the main electrodes 31a or the sub-electrodes 31b, 31c, 31d), serving as the transfers or the conducting portions, in all of the four corners A, B, C, D of the liquid crystal cell 10, as shown in FIG. 5.

The area Sa of the main electrode 31a in the corner A, and the respective areas Sb, Sc, Sd of the sub-electrodes 31b, 31c, 31d provided in other corners B, C, D have the following relation.

$$Sa > Sb; Sa > Sc; \text{ and } Sa > Sd \tag{1}$$

Thus, the number of kinds of the first electrodes 31 having different areas is at most four, in the case of Sa>Sb≠Sc≠Sd.

Moreover, the basic shape of the main electrode 31a and the sub-electrodes 31b, 31c, 31d can be changed according to the surrounding pattern. As described above, since the main electrode 31a functions mainly as a transfer, it is preferable that the main electrode 31a have a circular shape, a rectangular shape, or the like, in terms of ensuring the overlapping area with the crossing portion 2 of the sealant 13. Regarding the sub-electrodes 31b, 31c, 31d which are provided mainly as a measure against static electricity, the magnitude of the area is not important, but it is important that the sub-electrodes 31b, 31c, 31d do not interfere with the circuit portions 23a, 23b, 23c, 23d, 23x and the wirings 26, 27, which are located near the sub-electrodes 31b, 31c, 31d. Thus, it is preferable that the sub-electrodes 31b, 31c, 31d be shaped so as to be able to bypass the circuit portions 23a, 23b, 23c, 23d, 23x and the wirings 26, 27. It is preferable that the sub-electrodes 31b, 31c, 31d be shaped so as to have an outer edge extending along the sealant 13, or that the sub-electrodes 31b, 31c, 31d have an L-shape.

For example, the sub-electrode 31b has an L-shape in order to bypass the circuit portion 23x that occupies a rectangular region. Moreover, a part of the rectangular outer shape of the sub-electrode 31c, located on the display region 20 side, is cut out so as to have an outer edge extending along the curve of the sealant 13. Moreover, the sub-electrode 31d is formed so that its outer and inner outer edges have a circular arc shape.

That is, if electrodes of the same dimensions or the same shape are merely provided in all of the four corners, the electrodes interfere with the circuit portions located near the electrodes, and it is difficult to ensure the area that is large enough for the electrodes to sufficiently function as a transfer. Moreover, sufficient resistance to static electricity may not be obtained if the electrodes are not provided in all of the four corners.

In the third embodiment, on the other hand, a plurality of first electrodes 31, having various areas and shapes according to their functions, are provided on the first substrate 11. Thus, the function as a transfer can be ensured by the main electrode 31a having a large area, and the sub-electrodes 31b, 31e, 31d, which are the conducting portions provided as a measure against static electricity, can be positioned in other corners B, C, D of the liquid crystal cell 10 so as not to interfere with the circuit portions 23a, 23b, 23c, 23d, 23x, and the like. Thus, a reliable LCD device 1 having a small frame region 21 can be obtained.

In other words, since the number of main electrodes 31a, functioning as a transfer and causing an increase in area of the frame region 21, is reduced, the LCD device 1 having a small frame region 21 can be obtained, while maintaining the resistance to static electricity.

In addition, even though the liquid crystal cell 10 has a small frame region 21, electric charge can be uniformly supplied to the second electrode 32, whereby the display quality can be improved.

(Fourth Embodiment)

Figure 6:
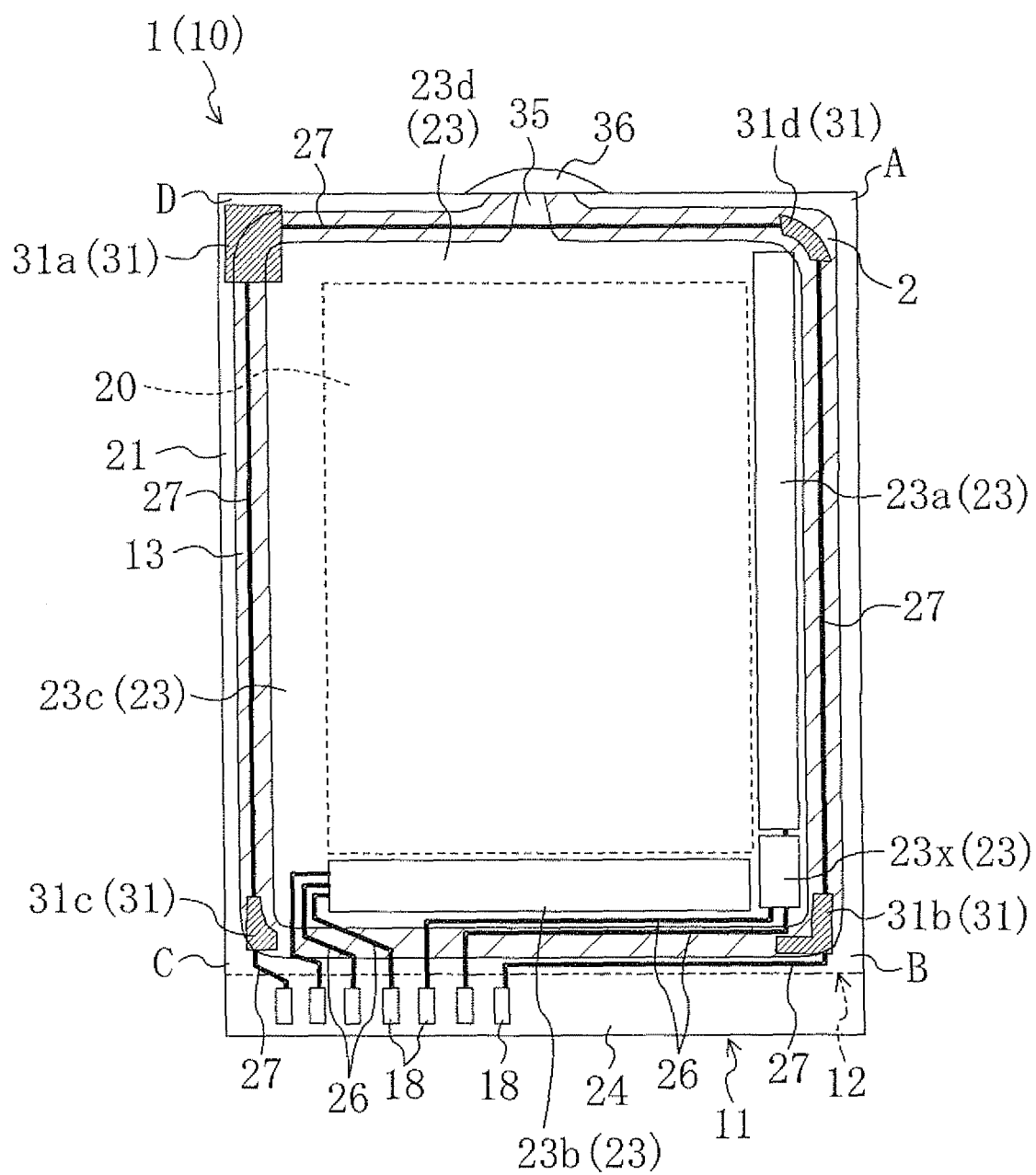
FIG. 6 is a plan view of a liquid crystal cell which is a main part of an LCD device of a fourth embodiment.
Figure 7:
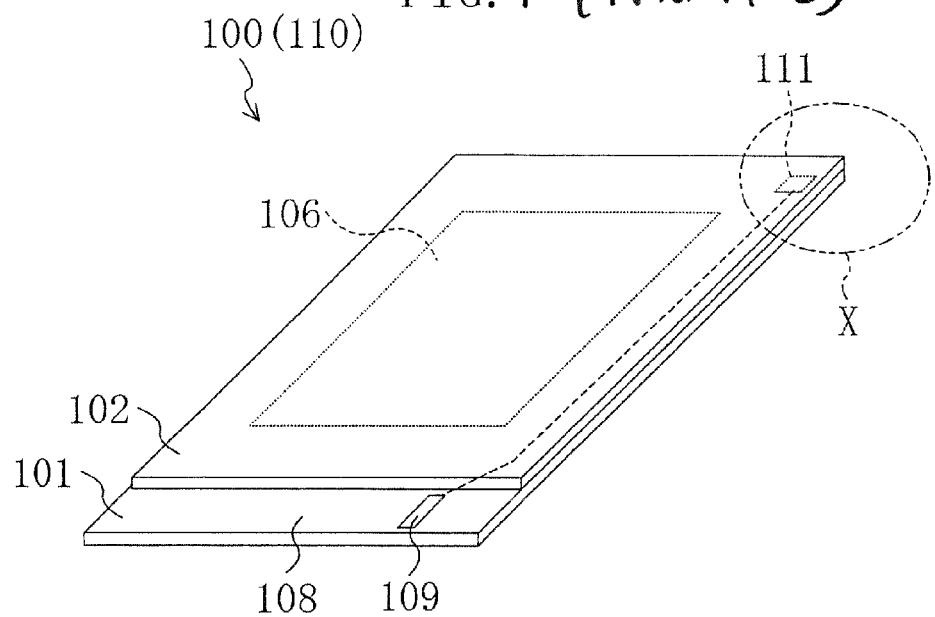
FIG. 7 is a perspective view of a main part of a conventional LCD device.
Figure 8:
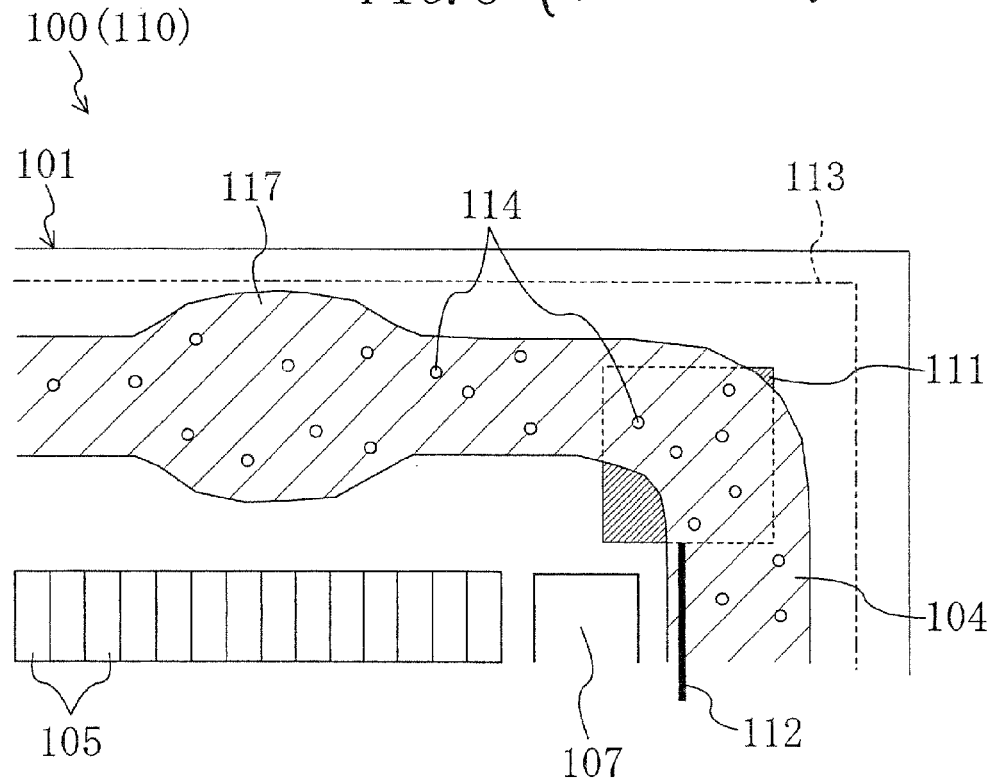
FIG. 8 is an enlarged partial plan view of FIG. 7.

FIG. 6 is a plan view of the liquid crystal cell 10, showing a fourth embodiment of the present invention.

The fourth embodiment is different from the third embodiment in the arrangement of the main electrode 31a and the sub-electrode 31d. Moreover, the circuit portions 23c, 23d are not provided. In addition, the fourth embodiment is different from the third embodiment in that a liquid crystal injection port 35 is formed in the sealant 13.

That is, as shown in FIG. 6, other embodiments can be employed in the case where the circuit portions 23 do not occupy all of the four sides of the display region 20, and the number of circuit portions 23 is small.

The liquid crystal cell 10 of FIG. 6 has only the circuit portions 23a, 23b, 23x as the circuit portions 23. Thus, since no circuit portion 23 is provided in the corner D, the corner D has a relatively large excess region. On the other hand, since the circuit portions 23a, 23b, 23x and the wirings 26, 27 are densely positioned in the corners A, B, C, the corners A, B, C have a relatively small excess region.

That is, the circuit portion 23a is provided in the corner A, and the circuit portion 23x is provided in the corner B. Moreover, the wirings 26 extended from the circuit portion 23b are densely positioned in the corner C. The wirings 26 extended from the circuit portion 23b correspond to a phase-developed video signal line group. The circuit portion 23x corresponds to, for example, a level shifter circuit or a protection circuit.

Moreover, as shown in FIG. 6, the sealant 13 need not necessarily be formed in a closed pattern, but may be formed as a seal pattern having the liquid crystal injection port 35. In this case, since a thermosetting sealant 13 can be used, the main electrode 31a and the sub-electrodes 31b, 31c, 31d may be made of a light-shielding conductive thin film. However, in terms of suppressing corrosion of the electrode due to the contact of different kinds of material in the transfer, it is preferable to cover the surfaces of the main electrode 31a and the sub-electrodes 31b, 31c, 31d with the same material as that of the second electrode 32 on the second substrate 12 (i.e., a transparent electrode such as ITO or IZO), even when the main electrode 31a and the sub-electrodes 31b, 31c, 31d are made of a light-shielding conductive thin film. Thus, the liquid crystal cell 10 is filled with a liquid crystal material through the injection port 35 by a so-called vacuum injection method, and the injection port 35 is sealed by a sealing part 36.

It is preferable that the main electrode 31a having a large area, which serves as a transfer, be positioned in an end of the frame region 21 which includes no circuit portion 23 (i.e., in the corner D in FIG. 6), and that the sub-electrodes 31b, 31c, 31d having a relatively small area be positioned in other corners B, C, D.

The area Sa of the main electrode 31a in the corner D, and the respective areas Sd, Sb, Sc of the sub-electrodes 31d, 31b, 31c provided in other corners A, B, C have the same relation as that represented by the expression (1) in the third embodiment.

Moreover, in the fourth embodiment as well, it is preferable to change the shape of the main electrode 31a and the sub-electrodes 31d, 31b, 31c, according to the circuit portions 23 and the sealant 13 which are provided around the main electrode 31a and the sub-electrodes 31d, 31b, 31c. Regarding the shape of the main electrode 31a as well, it is preferable to form the main electrode 31a in a circular or rectangular shape in terms of ensuring a large overlapping area with the sealant 13, as in the case of the third embodiment. The sub-electrodes 31d, 31b, 31c are preferably formed in similar shapes to those of the third embodiment.

Thus, according to the fourth embodiment, the main electrode 31a having the largest area, which functions mainly as a transfer, can be positioned in the corner D which has no circuit portion 23 and thus, has a relatively large excess region, while the sub-electrodes 31d, 31b, 31c having a small area, which mainly provide the resistance to static electricity, can be positioned in other corners A, B, C. This can suppress an increase in area of the frame region 21 due to the space for providing the main electrode 31a. Moreover, the resistance to static electricity can be increased by providing the sub-electrodes 31d, 31b, 31c in the corners A, B, C, respectively.

Moreover, since the sub-electrodes 31d, 31b, 31c are shaped so as to extend along the sealant 13, the area of the frame region 21 can be reduced, while ensuring the area for connection to the second electrode 32 through the conductive particles 15.

(Other Embodiments)

The fourth embodiment was described with respect to an example in which neither the crossing portion 2 nor the junction portion 3 is formed in the sealant 13. However, as in the first or second embodiment, the crossing portion 2 or the junction portion 3 may be formed in the sealant 13, and the main electrode 31a may be provided so as to at least partially overlap the crossing portion 2 or the junction portion 3. This enables electrical junction of the first electrode 31 with the second electrode 32 to be ensured in a larger area, while reducing the area of the frame region 21.

In the first through fourth embodiments, the conductive particles 15 contained in the sealant 13 are used to electrically connect the first electrode 31 and the second electrode 32 to each other. However, the present invention is not limited to this. For example, other conductive materials, such as carbon paste, may be used.

In the case of using the carbon paste, the carbon paste is applied to the first substrate 11 or the second substrate 12 before and after the step of drawing the sealant 13, and then, the first substrate 11 and the second substrate 12 are bonded together. Thus, the first electrode 31 and the second electrode 32 can be electrically connected to each other. In this case as well, the conducting portions, which serve as a measure against static electricity, can be provided without excessively increasing their size. Thus, an LCD device 1 in which the circuit portions 23 and the conducting portions do not interfere with each other, and which has a small, frame region 21, can be obtained.

Moreover, although the embodiments of the present invention were described above with reference to FIGS. 1 through 6, the present invention is not limited to these, and may be modified without departing from the spirit and scope of the present invention. For example, the terminals 18 may be provided along a plurality of sides of the liquid crystal cell 10, rather than being provided along only one side thereof. Moreover, the conducting portions, provided as a measure against static electricity, may be positioned on the sides of the liquid crystal cell 10 (i.e., between the corners), rather than being positioned in the corners of the liquid crystal cell 10.

Moreover, the present invention is not limited to monolithically forming both a scanning signal circuit and a data signal circuit, which are the circuits for driving the pixels 17, on the first substrate 11. Alternatively, for example, it is also possible to monolithically form the scanning signal circuit, while using an external driver IC (Integrated Circuit) as the data signal circuit.

Industrial Applicability

As described above, the present invention is useful for LCD devices in which a pair of substrates are electrically connected to each other through a conductive member. The present invention is especially suitable for reducing the area of a frame region as much as possible, and improving the reliability thereof.

The invention claimed is:

1. A liquid crystal display device, comprising:
a first substrate;
a second substrate provided so as to face the first substrate; and
a liquid crystal layer enclosed between the first substrate and the second substrate and surrounded by a sealant, wherein
the sealant contains a plurality of conductive members, and has a crossing portion formed so that a part of the sealant crosses another part thereof, when viewed from a direction normal to a surface of the first substrate or the second substrate,
a second electrode is formed on a surface located on the first substrate side of the second substrate,
a plurality of first electrodes, which are provided so as to face a part of the second electrode, and are electrically connected to the second electrode through the conductive members contained in the sealant, are formed over the first substrate, and
the first electrodes comprise a main electrode and at least one sub-electrode having a smaller area than an area of the main electrode, wherein the main electrode is provided so as to at least partially overlap the crossing portion of the sealant proximate a first corner of the second substrate and the sub-electrode having the smaller area is located proximate a second corner of the second substrate.

2. A liquid crystal display device, comprising:
a first substrate;
a second substrate provided so as to face the first substrate; and
a liquid crystal layer enclosed between the first substrate and the second substrate and surrounded by a sealant, wherein
a second electrode is formed on a surface located on the first substrate side of the second substrate,
a plurality of first electrodes, which are provided so as to face a part of the second electrode, and are electrically connected to the second electrode through a conductive member, are formed over the first substrate,
the first electrodes comprise a main electrode, and a sub-electrode having a different shape from that of the main electrode, when viewed from a direction normal to a surface of the first substrate,
the sub-electrode is shaped so as to extend along the sealant, when viewed from the direction normal to the surface of the first substrate; and
wherein the sub-electrode is formed in an L shape wherein the main electrode is provided to at least partially overlap the crossing portion of the sealant proximate a first corner of the second substrate and the sub-electrode having the different shape is located proximate a second corner of the second substrate.

* * * * *